CAVITY, WAVE GUIDE AND KLYSTRON INTERACTION
SPACE FORM A RESONANT CIRCUIT
Filed Jan. 24, 1966

3,344,363

CAVITY, WAVE GUIDE AND KLYSTRON INTERACTION SPACE FORM A RESONANT CIRCUIT

Terenzio Consoli, La Calle-St.-Cloud, René Le Gardeur, Paris, and Georges Mourier, Le Port-Marly, France, assignors to Commissariat à l'Energie Atomique, Paris, France Filed Jan. 24, 1966, Ser. No. 522,488
Claims priority, application France, Feb. 12, 1965, 5,415
1 Claim. (Cl. 331—83)

ABSTRACT OF THE DISCLOSURE

A generator produces a very intense high frequency electromagnetic field for use in the thermal treatment of a specimen. A klystron tube is used having an input interaction space and an output interaction space with two interaction spaces connected by a reaction channel which includes an isolator and a resonant cavity. The specimen is located in the resonant cavity. The resonant cavity is a part of a resonant assembly including the input interaction space of the klystron and a coupling waveguide.

The present invention relates to a device for generating a very intense hyperfrequency electromagnetic field. It frequently proves necessary to produce a field of this kind, for example when subjecting a specimen to a surface heat treatment or deep heat treatment or when confining, heating or accelerating a plasma.

In order to produce a high electromagnetic field, the quantity of energy applied to a resonant cavity which contains the specimen to be treated must be as high as possible. However, the nature, size and characteristics of said cavity can be widely different, thereby modifying in an unexpected and sometimes very rapid manner the resonance frequency of the cavity and consequently the impedance of this latter with respect to the generator.

A number of methods have been contemplated with a view to controlling the frequency of the generator in dependence on that of the resonant cavity. In particular, the generator employed for this purpose can be an electronically tunable oscillator of the backward wave type (carcinotron). In this case, part of the energy must be taken off at two points of the circuit employed and directed towards a feedback circuit consisting of a mixer, an oscillator, an intermediate-frequency amplifier, a rectifier and a D.C. amplifier. This feedback circuit serves to modify the voltage supply to the oscillator in such a manner as to maintain its operating frequency within the tuning band of the resonant cavity. Unfortunately, this equipment is complex, consumes a substantial amount of power and its response time is limited by the passband of the amplifiers which form part of the feedback circuit. Furthermore, the electronically tunable oscillators usually consist of tubes (valves) which operate continuously and the power of which is limited to a few kw.

In the case of certain applications, it is found preferable to make use of tubes which operate in a pulsed regime, thereby permitting of very high instantaneous power.

In view of the frequency variations of the cavity, it is necessary to utilize a tube having a wide operating band. The power which is developed by the amplifier is directed towards the input of the resonant cavity. At a point of said cavity which will be referred to hereinafter as the cavity output, a signal will be collected and fed back or re-injected into the tube input.

The system must satisfy two conditions in order to oscillate at the frequency of the cavity:

(a) The gain of the tube must be sufficient, at the frequency of the cavity, to compensate the insertion of this latter in the feedback loop, taking into account the reflection phenomenon which usually takes place at the input of the cavity.

(b) The total phase shift within the feedback loop must correspond to a whole number of cycles.

This last-mentioned condition is much more easily satisfied than the first, inasmuch as the feedback loop is solely passive. The response time is limited by the hyperfrequency circuits which are very rapid.

It can be demonstrated by calculation that, even in the case in which the tube employed has a very wide pass-band, the deviation of its operating frequency is limited by the transit time.

The oscillators which have the shortest transit time are triodes. However, triodes are not capable of high power outputs when the frequency is higher than 800 or 1,000 mc./s.

Furthermore, wide-band amplifiers which are capable of delivering high power are mainly constant-field traveling-wave tubes and klystrons.

Traveling wave tubes of existing types are high-gain tubes which have a transit time of the order of 20 cycles at least. Under these conditions, if $f_M$ and $f_m$ are the threshold operating frequencies, we have $$\frac{f_M - f_m}{f_m} \leq \frac{1}{80}$$

Unless special precautions are taken, the injection and re-injection circuits double the transit time and the frequency band in which the automatic tuning takes place is lower than 1%.

The automatic tuning band can be increased by reducing the electrical length of the tube as far as possible and consequently reducing its gain as well as by reducing those of the input and output circuits.

A ferrite isolator must always be inserted between the output of the tube and the input of the cavity. Unforeseen variations in the characteristics of the specimen can in fact result in total reflection of the incident energy towards the tube which would thus be liable to sustain damage if such an isolator were not provided. Another good reason for the use of an isolator in the case of a klystron lies in the fact that it has an impedance with respect to the output of the klystron which is practically independent of the characteristics of the cavity. It is a known fact that the output power of a klystron is largely dependent on the impedance of its load circuit; by virtue of the isolator, this frequency becomes practically independent of the impedance of the cavity.

In the accompanying drawings, FIG. 1 shows a system of known type which is designed to apply a high-intensity hyperfrequency field to a specimen 4 contained in a resonant cavity 6. This assembly comprises a generator and amplifier tube 8 with which is associated a feedback circuit 10 constituted by an isolator 12 connected in series with the resonant cavity which contains said specimen.

Taking account of the fact that the ferrit isolator has a transit time which corresponds to approximately 5 cycles and that it is impossible to reduce the electrical lengths of the tube and of the reinjection circuit to less than a few cycles, the device of FIG. 1 can operate only within a very narrow band. This is particularly inconvenient if different items of equipment such as measuring instruments and the like have to be introduced within the cavity.

The present invention is directed to a hyperfrequency generator which makes it possible to apply a very intense field to any given product and which is not subject to the disadvantages of known devices which have been discussed in the foregoing. The generator employed in accordance with the invention consists of a klystron which makes use of two interaction spaces and an external feedback loop.

The hyperfrequency generator employed has a feedback loop which comprises in series an isolator and a resonating system consisting of a resonant cavity, a waveguide which couples the output of said cavity with the first interaction space of the klystron, as well as said interaction space.

In order that the technical characteristics of the present invention may become more readily apparent, one example of embodiment thereof will now be described, it being understood that the example given does not imply any limitation either in regard to the modes of operation or in regard to the practical applications which may be contemplated.

Reference will be made in the following description to the accompanying drawings, in which.

Figure 1:
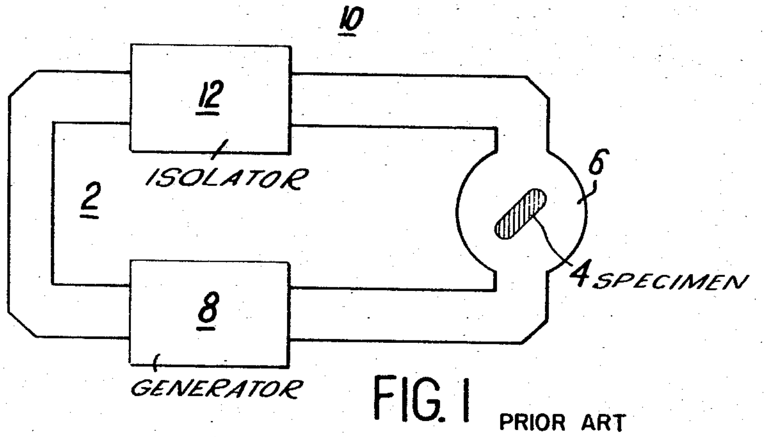
FIG. 1 PRIOR ART
FIG. 1 represents a system of known type which is designed to apply a hyperfrequency field to a product or specimen.
Figure 2:
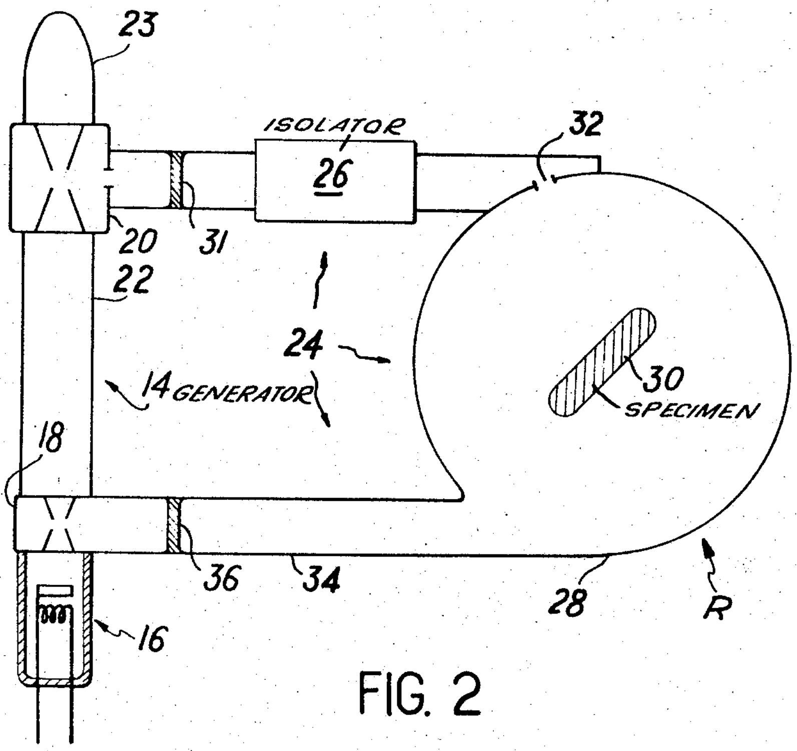
FIG. 2 represents a device in accordance with the invention.

The device of FIG. 2 consists of a tube (valve) 14 of the klystron type which comprises a cathode 16, an input interaction space 18 and an output interaction space 20, said spaces being separated by a drift tube 22 as well as an electron collector 23.

The device has a feed back channel 24 which comprises at the output a ferrite isolator 26 as well as a resonant system R. Said system consists of a resonant cavity 28 in which the product 30 to be treated is placed, a coupling waveguide 34 which couples the resonant cavity with the input interaction space 18, and said interaction space itself. The isolator is coupled by means of a seal 31 with the output interaction space 20 of the klystron and is also coupled with the cavity 28 by means of a coupling device 32, the coupling factor being low. The input interaction space 18 forms an integral part with the resonant cavity 28 inasmuch as it is not separated from this latter by a coupling device having a low coupling factor; however, the tube 34 which couples the input interaction space with the main part of the resonant cavity is also provided with a seal 36. It should be noted that a standing-wave state prevails in the waveguide which couples the input interaction space with the main part of the cavity whereas a traveling wave is propagated within the waveguide which provides a coupling with the output interaction space of the cavity.

Tubes of the klystron type which are designed for pulsed operation have an advantage in that they are capable of delivering very high peak power and can additionally serve to produce pulses of relatively long duration, taking into account the large dimensions of the cathode and of the electron collector; finally, the length of the drift tube can be reduced to that which corresponds to a phase rotation of $4\pi$ if it is desired that the gain should not be higher than 6 to 10 decibels. In addition, in a klystron, the electron beam interacts over a short length with an intense stationary field. In the example shown, the input interaction region forms part of the cavity in which the product or specimen to be treated is located. Instead of three cavities, there is therefore one output interaction cavity 20 and one cavity 28 of complex shape.

The shape of the resonance cavity and the dimensions of the interaction space are so determined as to present the requisite fields to the beam so that a total specific electromagnetic energy is applied to the specimen and a specific power absorption within the specimen corresponds to this stored energy. The klystron beam current must be sufficient to supply this power by mutual action with the existing fields; this conditoin can always be fulfilled except in the case of a cavity having a very low overvoltage. Irrespective of the detuning which is due to the treated specimen, there is always a field in the input interaction space inasmuch as this latter forms an integral part with the cavity.

By making use of a resonant cavity of conventional type which does not have an input interaction space, it would be possible to obtain only a much narrow band inasmuch as the beam current which flows through the input interaction space would be modulated only to a very small extent.

In a device of the type hereinabove described which has actually been constructed by the present Applicant, the total transit time within the circuit formed by the assembly consisting of the feedback loop and the drift tube is ten cycles, namely five in the case of the ferrite isolator and two in the case of the drift tube 22; under these conditoins, the automatic tuning band can attain 2 to 3%. The cavity resonates at a frequency in the vicinity of 1,250 mc./s. and oscillates the $TE_{110}$ mode; the operating band of the cavity makes it possible to introduce therein a metallic specimen of approximately 500 cm.$^3$.

What we claim is:

Hyperfrequency generator for applying a very intense field to a product comprising a klystron, an input interaction space and an output interaction space for said klystron, a feedback loop comprising in series an isolator and a resonating system including a resonant cavity, said isolator being connected to said output interaction space and a wave guide coupling the output of said cavity and said input interaction space of said klystron, said wave guide, said cavity and said input interaction space forming a single tuned resonant circuit.

References Cited

UNITED STATES PATENTS

| | | | |
|---|---|---|---|
| 2,445,811 | 7/1948 | Varian | 331—83 |
| 2,504,109 | 4/1950 | Dakin et al. | 219—10.55 |
| 3,210,513 | 10/1965 | Lenart | 219—10.55 |

ROY LAKE, *Primary Examiner*.

JOHN KOMINSKI, *Examiner*.